July 6, 1965         W. G. HARRISON ETAL         3,193,081
               BLOCKING MEANS FOR ARTICLE ACCUMULATOR
Filed Nov. 2, 1962                                3 Sheets-Sheet 1

WALTER G. HARRISON
LEO A. GARY
ALLAN C. AUDET
            INVENTORS

BY
Ooms, Mc Dougall and Hersh
                ATT'YS.

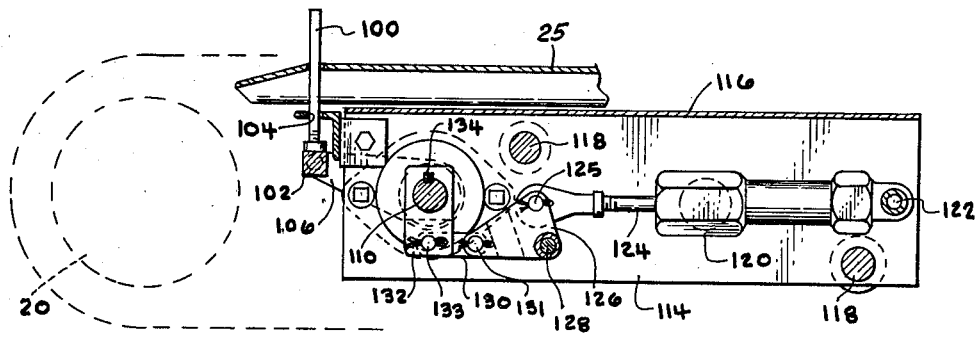
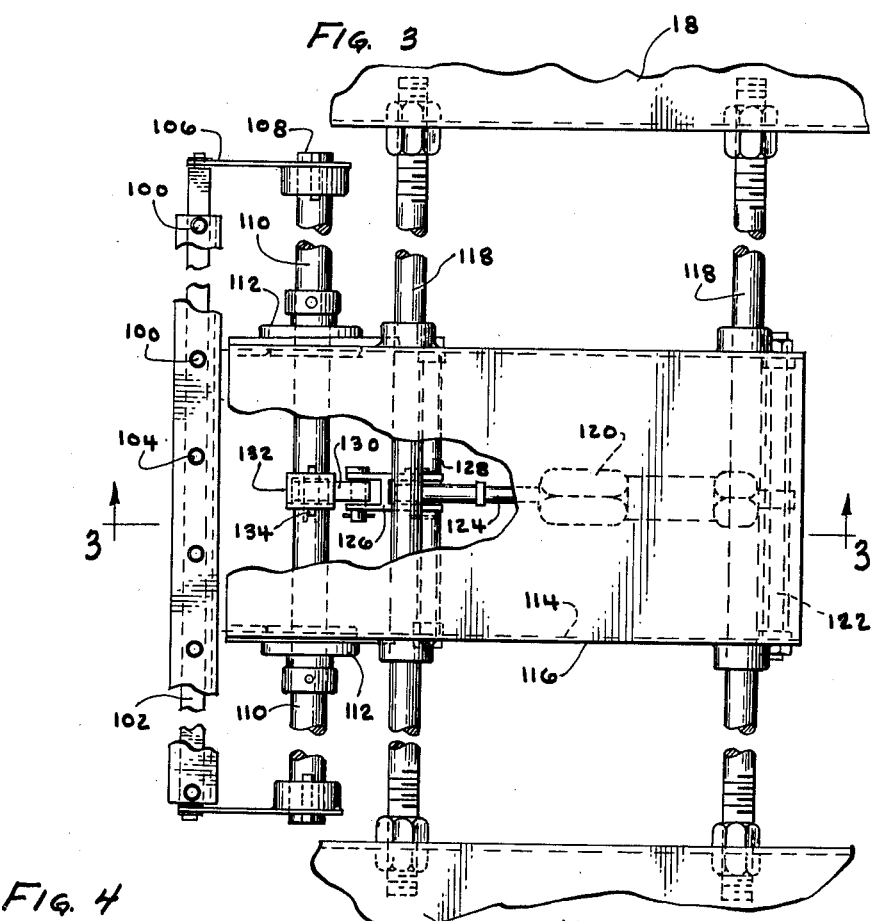

WALTER G. HARRISON
LEO A. GARY
ALLAN C. AUDET
INVENTORS

United States Patent Office 3,193,081
Patented July 6, 1965

3,193,081
BLOCKING MEANS FOR ARTICLE ACCUMULATOR
Walter G. Harrison, Westchester, Leo A. Gary, Chicago, and Allan C. Audet, Arlington Heights, Ill., assignors to Prospect Manufacturing Co., Inc., Chicago, Ill., a corporation of Illinois
Filed Nov. 2, 1962, Ser. No. 235,103
7 Claims. (Cl. 198—37)

This invention is directed to improvements in article handling mechanisms; and, in particular, it is directed to improvements in mechanisms which are designed for accumulating several articles whereby these articles can be disposed on and removed from the mechanism in a unique fashion.

In a copending application Serial No. 81,754, filed January 10, 1961, and entitled Automatic Sortation System, there is disclosed an apparatus which provides for passing of articles to a conveyor and for subsequent delivery of these articles to any of a plurality of preselected stations. The prior disclosed apparatus, in addition, provides for coding of the articles as they are passed to the conveyor. A memory system is provided in conjunction with the transfer means whereby the articles can be deposited by the conveyor on either side of the conveyor at locations corresponding to the various codes.

Means have been devised for transferring articles to conveyors of the type described in the aforementioned application. For example, transfer means of the type described in an additional copending application Serial No. 139,140, now Patent No. 3,140,771, filed September 19, 1961, and entitled Delivery Apparatus, have been found extremely efficient. With transfer means of the type described in the later filed application, articles can be delivered to a conveyor automatically and with great speed. Furthermore, these delivery means are capable of providing for assignment of the above mentioned codes to the articles before they are passed to the conveyor portion of the system which is equipped with the memory device. In accordance with the later filed application, the assigned code can be transferred to the memory device at the same time that the corresponding article is transferred to the conveyor. With this arrangement, articles transferred will be delivered by the conveyor to a desired station.

Systems of the above type are particularly suitable where a heavy and relatively steady flow of articles is presented for handling. Thus, the above described systems operate at greatest efficiency where rapid movement of articles is desired in order that pile-up of articles will not be experienced.

In some applications, of course, a steady flow of articles cannot be expected and, therefore, many installations of the type described would be faced with periods of extremely heavy load which are preceded and followed by relatively little activity. It is not desirable to have the installations in operation during periods of low activity, while at the same time, it has been found preferable to provide means which will avoid slow-downs and pile-ups during peak periods. Some post office operations illustrate the above points. In such operations, there are generally daily periods of peak activity. On the other hand, during certain intervals of every day there may only be occasional package or mail sack deliveries which would not warrant the operation of the entire delivery and conveyor apparatus.

In copending application Serial No. 186,523, filed April 10, 1962, there has been described means adapted to accumulate a plurality of articles and adapted to transfer the articles to a conveyor mechanism in a unique fashion. The article accumulator described in this application is generally designed to provide several individual sections each of which is adapted to hold an individual article. Articles are loaded one at a time at a loading end of the accumulator and they are moved thereby to the nearest empty section on the accumulator. Detecting means, such as photocells, are utilized to control the movement of the various sections whereby the succeeding sections will always be occupied by the last delivered articles. The apparatus described in this application is adapted to transfer articles one at a time to a moving conveyor or to other means and this transferring operation can take place in a continuous manner or articles can be allowed to accumulate for any desired period on the apparatus before transfer begins.

The present invention constitutes an improvement over the accumulator systems of the type described in the last mentioned copending application. The means of this invention are designed to increase the versatility of use of such accumulators since they permit handling of articles of all shapes and sizes on these mechanisms.

In particular, the improvements of this invention are designed to overcome difficulties which are presented if an article should roll or slide on to a succeeding section of the accumulator. In such a situation, an article would not be on the proper section of the accumulator, and if the articles were being coded, a displaced article would be directed to an incorrect destination or otherwise mishandled.

It is therefore a general object of this invention to provide modifications in article accumulator mechanisms which are adapted to increase the versatility of such mechanisms whereby the handling of articles of all shapes and sizes can be accomplished.

It is a more particular object of this invention to provide an article accumulator mechanism which includes a plurality of blocking means adapted to be associated with the various sections on an accumulator whereby articles, such as large round objects, can be held on a given section until it is desired to pass the article to a succeeding section.

These and other objects of this invention will appear hereinafter and for purposes of illustration but not of limitation specific embodiments of this invention are shown in the accompanying drawings in which:

FIGURE 3 is an enlarged side elevation taken about the line 3—3 of FIGURE 4 and illustrating the operating means for the gate assembly of this invention;

FIGURE 4 is a plan view of the operating mechanism for the gate assembly; and

Figure 1:
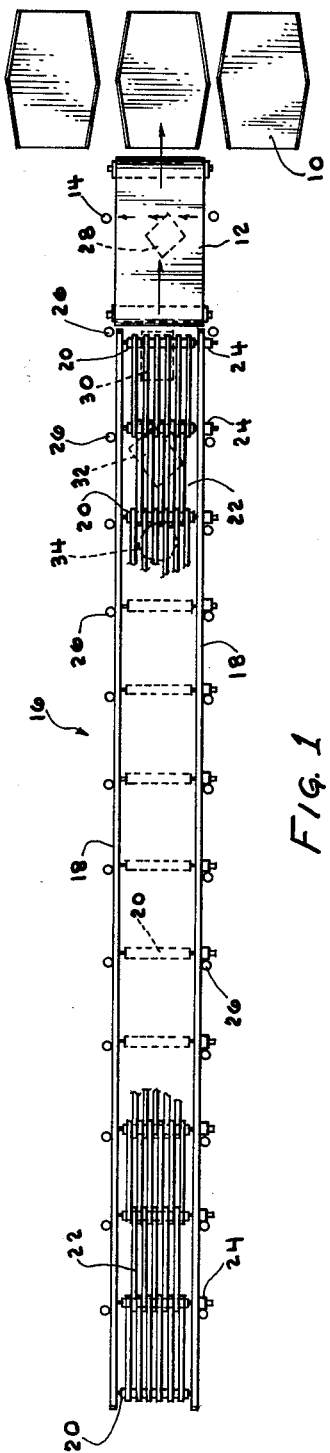
FIGURE 1 is a plan view of an article accumulator mechanism adapted to be modified in accordance with this invention.

The improvements of this invention are generally designed for use in combination with an article accumulator construction which includes a plurality of sections each adapted to retain an article. Means are provided for moving articles from one section to another on the accumulator so that the articles will eventually move from the entry end to the discharge end of the accumulator.

The improvement to which this invention is directed comprises a gate assembly which is adapted to block the movement of articles from one section to another at times when the article traversing means for these sections are inoperative. In other words, the gate assembly of this invention operates to prevent the transfer of articles from one section on an accumulator to another unless the drive means for the various sections is operating to carry out such transfer.

In accordance with the preferred form of this invention, the gate assembly includes stop means which move into the path of articles on the accumulator and which are adapted to move out of this path when the accumulator apparatus is actuated to cause transfer of articles from one section to another. These stop means advantageously comprise fingers which extend upwardly through openings in the various accumulator sections. These fingers are operatively connected to the drive means for the various accumulator sections so that the cycling of the fingers from blocking to unblocking position can be coordinated with the changing of the drive means from stop and go positions.

In accordance with this invention, the operating means for the blocking fingers preferably comprises a piston which is connected to a crank arm arrangement. The reciprocal movement of the piston in a horizontal direction is caused to provide reciprocal movement in a vertical direction of the blocking fingers by means of the crank arm. In order to correlate the operation of the piston means with the drive means for the respective sections on the accumulator, the piston means operation is preferably governed by detecting means included in the accumulator structure. These detecting means, which may be a photocell or the like, are provided for each accumulator section and are adapted to stop the drive means for a given section when an article is disposed in the path of these detecting means. By causing operation of the drive means and the blocking means through operation of the detecting means, the blocking means can be caused to move to blocking position when the drive means stops a given accumulator section. Correlation of the operation can therefore be accomplished.

An important feature of the blocking means operation results from the use of the crank arm. Thus, it has been found that the crank arm can be utilized as a locking means for the fingers when they are disposed in the blocking position. This represents an important characteristic of the apparatus since articles which tend to push downwardly on the fingers will not move these fingers; and, therefore, the blocking character of the fingers is maintained irrespective of the shape of the articles disposed on the accumulator.

In the accompanying drawings, FIGURE 1 illustrates an accumulator structure of the type described in copending application Serial No. 186,523. The structure shown is adapted to transfer articles to conveyor trays 10 which are moving in a path lying perpendicular to the direction of movement of the accumulator. The transfer belt 12 is provided for transferring articles from the accumulator to the tray 10. This belt may comprise a two-speed belt of the type described in the aforementioned copending application Serial No. 139,140, now Patent No. 3,140,771. A belt of this type is adapted to carry articles at low speed until the articles move into the path of an electric eye 14. At this time, the belt stops and remains stationary until an empty tray 10 is in position to receive the article on the belt. A high speed drive means for the belt is then adapted to be operated and the article will be passed to the empty tray.

The accumulator positioned adjacent the belt 12 has been generally designated by the numeral 16. This accumulator includes elongated frame members 18 and rollers 20 mounted in parallel relation between the frame members. A plurality of belts 22 are mounted to pass around the rollers 20. Supporting pans 25 are disposed beneath the belts and serve to prevent sagging and also to prevent passing of small articles between the belts.

It will be noted that the belts 22 are arranged in sets thereby providing a plurality of individual sections along the length of the conveyor. The belts of a given set are alternately spaced with respect to the belts in immediately adjacent sets and an intermeshing relationship between the belts therefore exists. Due to this relationship, the upper reach of one set of belts is overlapping with respect to the upper reach of an adjacent set.

As explained in application Serial No. 186,523, the rollers 20 are made up of an idler portion and a motor driven portion. In the right hand belt section, each of the belts is disposed around a motor driven portion of the first roller 20 and the motor 24 associated therewith is adapted to move the upper reach of this belt section toward the transfer belt 12. At the opposite end of this right hand belt section, the belts thereof are disposed around the idler portion of the second roller 20. A motor 24 drives the driven portion of this roller 20 to thereby provide for movement of the second belt section. The third roller 20 provides the idler portion for the second belt section and the driven portion for the third belt section, and so on to the entry end of the accumulator. At the entry end of the accumulator, the motor 24 drives the last belt section which has the belts thereof disposed over the idler portion of the left hand roller 20.

Each of the belt sections on the conveyor is provided with detecting means 26 which are operatively connected to the drive means for the respective belt section. These detecting means, which may comprise photocells, operate to stop the associate belt sections when an article comes to rest in their path. In this manner, individual articles can be caused to accumulate on the accumulator in an orderly sequence.

In explaining the operation of the mechanism shown in FIGURE 1 in conjunction with the improvements of this invention, it will be assumed that the conveyor trays 10 are motionless and, therefore, the accumulator will retain articles deposited thereon. The first article 28 deposited will move all along the accumulator until it comes to rest on the belt 12 across the beam of the photocell 14. As explained, the belt 12 will not operate at high speed to transfer an article to the conveyor trays until a tray is in position to receive an article. Ordinarily, a tray moving into position will be caused to actuate a switch which will initiate high speed operation of the belt 12, but since the conveyor trays are at rest, this sequence will not take place.

The next article 30 will come to rest on the right hand belt section across the beam of the right hand accumulator photocell 26. Since the belt 12 is motionless, it will not draw the article 30 off the right hand belt section, and, therefore, the article 30 will continue to disrupt the beam of the associated photocell 26 and the right hand motor will therefore stop and bring the last section of the conveyor to rest. The next article 34 will bring the third belt section to rest in the same manner.

It will be appreciated that if the article 34 is a spherical object as shown, there would be an obvious tendency for this article to continue moving even when the second belt section is at rest. In other words, even though the second belt section will not draw the article 34 away from the third belt section, the momentum of the article 34 could easily carry it on to the second belt section.

In accordance with this invention, the undesired movement of articles beyond a certain point in the accumulator is prevented by blocking means which extend into the path of an article when it is desired to hold the article on a given belt section. In the example given, the blocking means for a given section are designed to operate at the same time that the drive means for the succeeding section operates to stop movement of the succeeding section. To illustrate, when the article 32 breaks the beam of the second accumulator photocell 26, the motor 24 for the second belt section will become inoperative. At the same time, blocking means are made operative to block off the discharge end of the preceding belt section so that the article 34 will be prevented from moving onto the second belt section. It will be appreciated that the photocells for the various sections are uniquely suitable for coordinating operation of the blocking means and drive motors.

Figure 2:
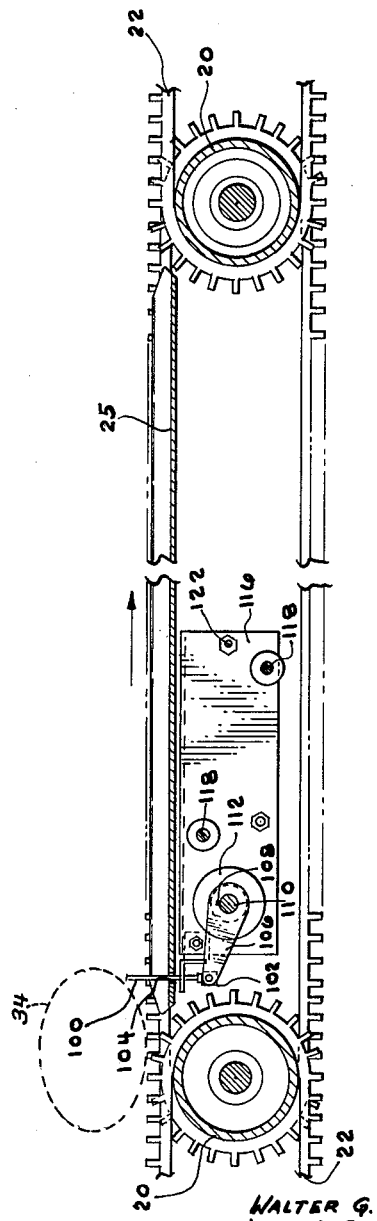
FIGURE 2 is a side elevation of an accumulator section provided with the gate assembly which provides the blocking means of this invention.

FIGURES 2, 3 and 4 illustrate a gate assembly which is adapted to operate in accordance with the above explanation. This gate assembly includes a plurality of fingers 100 which extend upwardly from a horizontal mounting bar 102. These fingers extend through openings 104 which are formed in the supporting pans 25. The bar 102 is secured at its ends to a pair of arms 106. These arms are keyed at 108 to a shaft 110 which rotates in journals 112 formed in the side walls 114 of a mounting plate 116. This mounting plate is secured to the frame members 18 of the accumulator by means of the rods 118.

A hydraulic cylinder and piston arrangement 120 is pivotally connected to the mounting plate 116 by means of the rod 122. The piston 124 is connected by means of the pin 125 to one corner of a crank arm 126. The fulcrum of this crank arm is provided by cross bar 128 which is secured to the side walls 114 of the plate 116.

A link 130 is connected by means of pin 131 to another corner of the crank arm 126. The opposite end of this link is connected to the bracket 132 by means of pin 133. The bracket 132 is keyed as shown at 134 to the shaft 110.

In FIGURE 3, the fingers 100 are shown in the blocking position. In order to move the fingers downwardly to clear the path for movement of articles along the conveyor, the piston 124 is drawn inwardly which results in pivoting of crank arm 126 about the rod 128. Through the action of link 130, the bracket 132 is moved approximately 90° whereby the arms 106 operate to pull the bar 102 and the associated fingers downwardly.

The forward stroke of the piston 124 obviously results in the reverse movement of the described components whereby the fingers 100 can be moved to blocking position. It is to be noted that the described arrangement provides for locking of the fingers when in the raised position since downward force exerted on the fingers will not result in lowering of the fingers. Accordingly, odd-shaped objects, such as the spherical article 34, will not cause lowering of the fingers 100 if they are large enough to exert a downward pressure on these fingers.

This locking feature results since the longitudinal axis of the link 130 passes through the axis formed by the fulcrum of the crank arm. The link 130 therefore forms a rigid extension of the crank arm when downward pressure on the fingers results in a lateral force being exerted by the bracket 132 on the link 130.

It will be apparent that the detecting means 26 can easily be utilized for controlling the stroke of the piston 124. These detecting means, when employed for stopping the motor 24 of one section on the accumulator, can simultaneously be employed for causing a forward stroke of the piston 124 associated with the section immediately preceding the first mentioned section. Therefore, articles on the latter section will not roll onto the first mentioned section. These articles will, however, be drawn onto this section when the photocell for this section causes operation of the associated motor 24 and simultaneously causes lowering of the blocking means for the preceding section.

Figure 5:
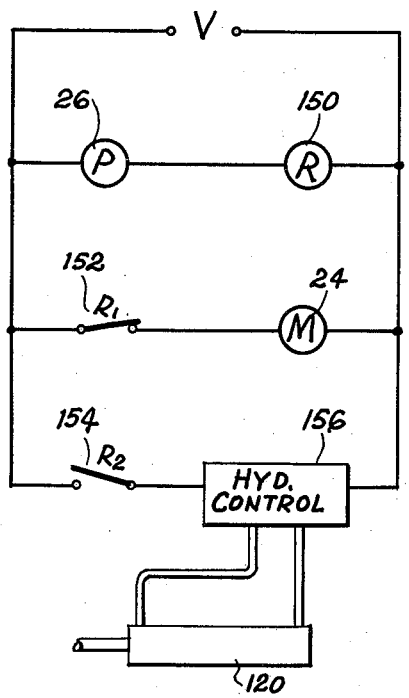
FIGURE 5 is a diagrammatic illustration of a circuit employed for operation of the drive means for the accumulator sections and gate assemblies of the invention.

FIGURE 5 illustrates a suitable circuit for operating the drive mechanisms of this invention. In the illustration, the photocell 26 is placed in line for operation of relay 150 in the conventional manner. This relay in turn serves to operate switches 152 and 154. When the beam of the photocell 26 is broken, the relay 150 will be energized opening switch 152 and thereby shutting off motor 24. The relay will at the same time act to close switch 154 for operating the control 156 associated with piston 120. With this arrangement, the motor and gate assembly operations can take place simultaneously for each of the individual sections in the manner described above. It will be appreciated that the illustrated circuit is provided only as an example of a typical photocell operation, and that other arrangements can obviously be employed for achieving equivalent results.

It is believed that there has been described a highly beneficial improvement for use in combination with article accumulator mechanisms. The improvements of this invention are particularly suitable for increasing the versatility of such accumulator mechanisms since they permit the handling by these mechanisms of articles of all shapes and sizes.

It will be understood that various modifications can be made in the above described construction which provide the characteristics of this invention without departing from the spirit thereof particularly as defined in the following claims.

That which is claimed is:

1. In an article accumulator construction which includes a plurality of sections each adapted to support an article thereon, motor means for independently driving the respective sections and detecting means associated with each section for detecting the presence of an article on a section and actuating means for individually stopping the motor means of each section whereby articles can be accumulated on the construction, said sections being arranged whereby articles resting on a particular section after stopping of the motor means therefor will be in position for transfer to a succeeding section upon restarting of the motor means for such succeeding section, the improvement in such construction comprising a gate assembly adjacent the discharge end of each of said sections, the gate assembly for each section being adapted to block the movement of an article from the discharge end of each said section to a succeeding section, said assembly including stop means, means movably mounting said stop means, drive means for moving said mounting means whereby said stop means can be positioned in the path of movement of articles on said sections and whereby said stop means can be moved out of said path when said articles are to be passed to a succeeding section of said accumulator, and means for operating the drive means for the gate assembly of a particular section responsive to the stopping of the motor means for an immediately succeeding section.

2. A construction in accordance with claim 1 wherein said stop means comprise a plurality of fingers which extend upwardly through said sections when in blocking position and which are moved downwardly when displaced out of said path.

3. A construction in accordance with claim 2 including a horizontal bar providing the mounting means for said fingers, a pair of arms connected to said bar for moving it in a vertical plane, and a rotatable shaft connected to said bar, a piston means, and a crank arm operated by said piston means adapted to rotate said shaft and to thereby cause vertical movement of said bar and fingers.

4. A construction in accordance with claim 3 wherein said piston reciprocates in a generally horizontal plane, and wherein a link connects said crank arm to said shaft, the longitudinal axis of said link passing through the fulcrum point of said crank arm when said fingers are in blocking position whereby downward force on said fingers is transmitted along said axis thereby locking said fingers in the blocking position.

5. A construction in accordance with claim 2 wherein said drive means for moving said mounting means comprise piston means, control means for operating said piston means, said control means being operatively connected to said detecting means whereby the fingers of a gate assembly for a particular section are moved to blocking position by said piston means simultaneously with the stopping of the motor means for the particular section.

6. A construction in accordance with claim 5 including means for locking said fingers in blocking position whereby articles on said sections are unable to displace said fingers when the articles engage said fingers.

7. In an article accumulator construction which includes a plurality of motor driven belt sections, the belts in adjacent sections intermeshing whereby articles can be transferred from one section to a succeeding section and to thereby be caused to traverse said accumulator, motor means for independently driving the respective sections and detecting means associated with each section for detecting the presence of an article on said section and actuating means for individually stopping the motor means of said section whereby articles can be accumulated on the construction, said sections being arranged whereby articles resting on a particular section after stopping of the motor means therefor will be in position for transfer to a succeeding section upon restarting of the motor means for such succeeding section, the improvement in such construction comprising a gate assembly adjacent the discharge end of each of said sections, the gate assembly for each section being adapted to block the movement of an article from the discharge end of each said section to a succeeding section, said assembly including stop means, means movably mounting said stop means, drive means for moving said mounting means whereby said stop means can be positioned in the path of movement of articles on said sections and whereby said stop means can be moved out of said path when said articles are to be passed to a succeeding section of said accumulator, and means for operating the drive means for the gate assembly of a particular section responsive to the stopping of the motor means for an immediately succeeding section.

References Cited by the Examiner

UNITED STATES PATENTS

| | | | |
|---|---|---|---|
| 1,199,818 | 10/16 | Peck | 198—190 |
| 2,403,673 | 7/46 | Mead | 198—34 |
| 2,769,520 | 11/56 | Davidson | 198—26 |
| 2,978,092 | 4/61 | Phillips | 198—78 |

SAMUEL F. COLEMAN, *Primary Examiner.*

ERNEST A. FALLER, JR., *Examiner.*